Figure 1:
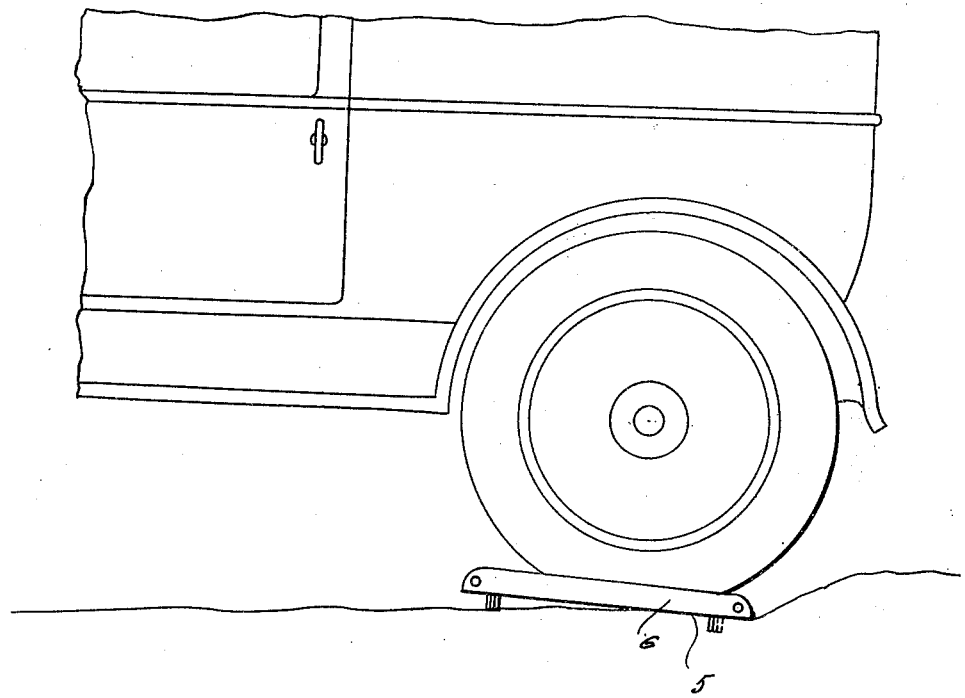

July 26, 1932.  D. E. HOFFMAN  1,868,942
SKID FOR MOTOR VEHICLES
Original Filed Jan. 29, 1931  2 Sheets-Sheet 1

Inventor
D. E. Hoffman
By Clarence A O'Brien
Attorney

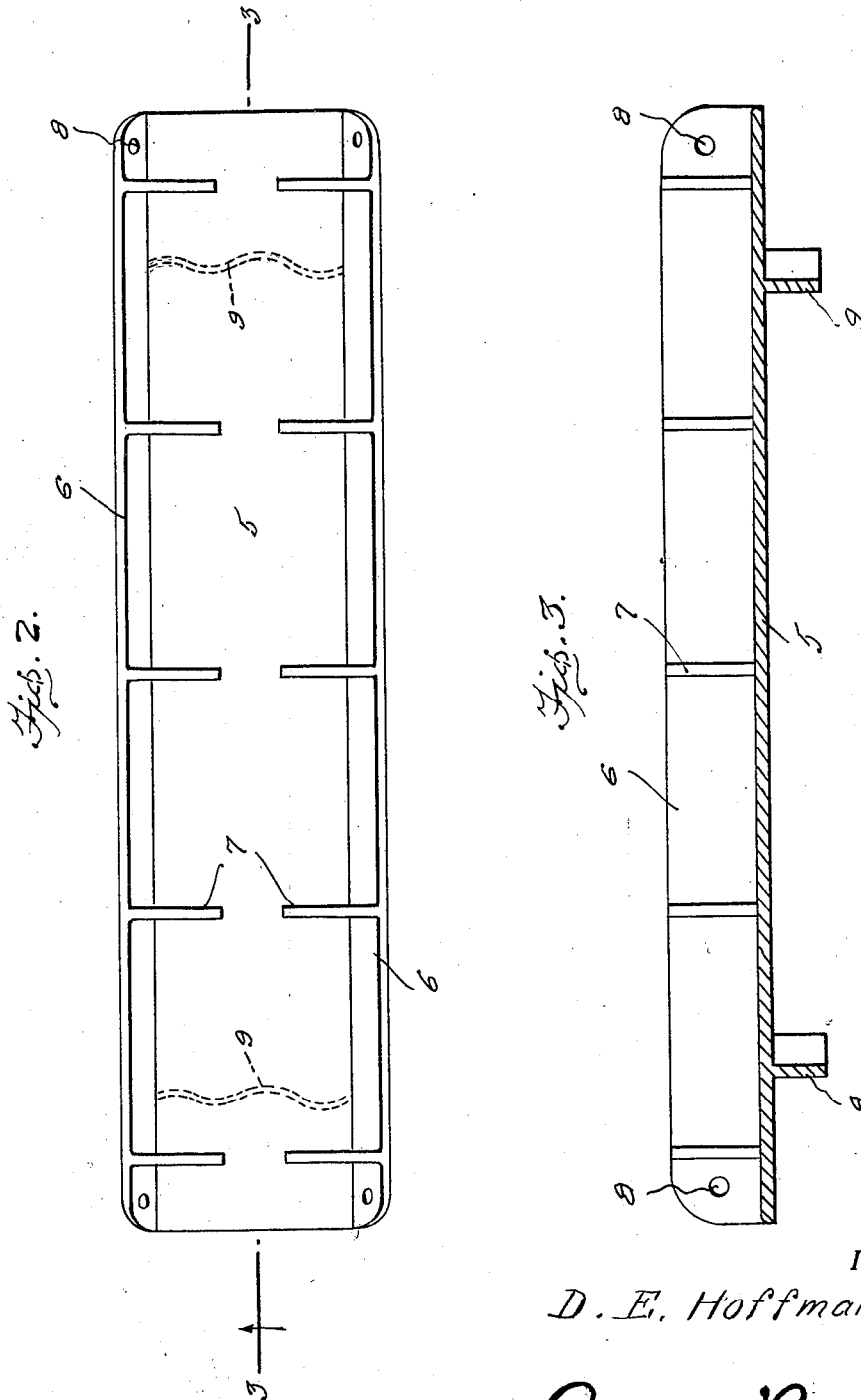

Patented July 26, 1932

1,868,942

UNITED STATES PATENT OFFICE

DAVID E. HOFFMAN, OF JACKSON, MICHIGAN

SKID FOR MOTOR VEHICLES

Application filed January 29, 1931, Serial No. 512,127. Renewed May 23, 1932.

The present invention relates to a skid or extricating device for motor vehicles, and the object is to provide improved means by the use of which a motor car or truck may be driven out of a run in soft earth, snow or the like without the necessity of employing jacks, blocking up the wheels, and the use of other means and without the use of chains or the like.

A further important object of the invention is to provide a strong and durable device of comparatively small size and light weight, being perfectly formed as a single casting or having its parts welded together, so that one or more of these devices may be readily carried at all times in any automobile and may be effectively used.

A still further very important object of the invention resides in the provision of a device of this nature which is simple in its construction, inexpensive to manufacture, thoroughly efficient and reliable in use, and otherwise well adapted to the purpose for which it is designed.

With the foregoing and other objects and advantages in view, the invention consists in the novel construction and formation of the device and of the various portions thereof, it being understood that modifications may be made within the scope of the invention as claimed hereinafter without departing from the spirit of the invention.

Figure 4:
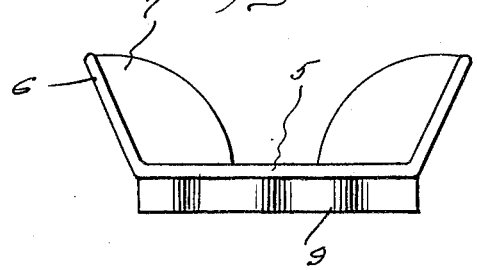
Figure 5:
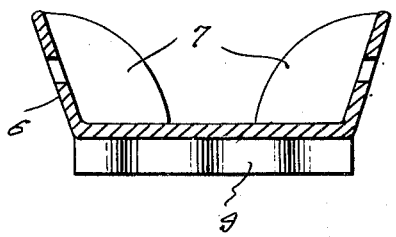

In the drawings:

Figure 1 is a view of the device in side elevation, and operative position, a portion of the motor car being shown, Figure 2 is a top plan view of the device, Figure 3 is a longitudinal section therethrough taken substantially on the line 3—3 of Figure 2, Figure 4 is an end elevation of the device, and Figure 5 is a transverse section therethrough.

The device is of suitable size and weight, especial attention being directed to the fact that the length and other dimensions of the device are not of the essence of the invention. The bottom of the channel elements is designated by the numeral 5 and the sides by the numerals 6. Within the channel and on the upper surface of the bottom are spaced apart at suitable intervals cleats 7. These cleats 7 project inwardly from the sides 6 and upwardly from the bottom 5 and having their free ends spaced apart as shown in Figure 2. The outer edge of each cleat is of arcuate construction. The end portions of the sides are provided with openings 8 in order that chains or the like may be engaged therewith for coupling two or more of the devices together or to be used in any other suitable manner.

Across the lower surfaces of the bottom 5 adjacent the ends thereof are sinuous cleats 9 to engage in the ground, snow, ice or the like.

The device being placed in position in the manner indicated in Figure 1, the wheel immediately engages the first pair of cleats at the end of the device and tractive effect is realized at the beginning of the operation, the wheel advancing through the channel and engaging the successive cleats 7 and of course causing the device to be pressed downwardly so that the bottom cleats 9 grip in the earth, snow or the like.

Low cost, durability, facility in application and effectiveness in use are among the principal advantages of the device.

The present embodiment of the device has been disclosed in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. A skid for an automobile or like vehicle comprising a channel element having a bottom and a pair of sides rising from the longitudinal edges thereof, and a plurality of cleats extending upwardly from the bottom and inwardly from the sides and having their free edges of arcuate formation and spaced apart for receiving a tread of a wheel between them.

2. A skid for an automobile or like vehicle comprising a channel element having a bottom and a pair of sides rising from the longitudinal edges thereof, and a plurality of cleats extending upwardly from the bottom and inwardly from the sides and having their free edges of arcuate formation and spaced apart to receive the tread of a wheel between them, and a pair of sinuous transverse cleats depending from the bottom adjacent the ends thereof.

In testimony whereof I affix my signature.

DAVID E. HOFFMAN.